United States Patent
Haritaoglu et al.

(10) Patent No.: US 10,785,508 B2
(45) Date of Patent: Sep. 22, 2020

(54) SYSTEM FOR MEASURING VIDEO PLAYBACK EVENTS USING A SERVER GENERATED MANIFEST/PLAYLIST

(71) Applicant: Google Inc., Mountain View, CA (US)

(72) Inventors: Ismail R. Haritaoglu, Palo Alto, CA (US); Oztan Harmanci, Mountain View, CA (US); Alper Turgut, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/590,973

(22) Filed: May 9, 2017

(65) Prior Publication Data
US 2017/0332113 A1    Nov. 16, 2017

Related U.S. Application Data

(60) Provisional application No. 62/334,143, filed on May 10, 2016, provisional application No. 62/334,221, filed on May 10, 2016.

(51) Int. Cl.
*H04N 7/10* (2006.01)
*H04N 21/234* (2011.01)
(Continued)

(52) U.S. Cl.
CPC ... *H04N 21/23424* (2013.01); *H04L 65/4084* (2013.01); *H04L 67/02* (2013.01);
(Continued)

(58) Field of Classification Search
CPC ............... H04N 21/235; H04N 21/435; H04N 21/4331; H04N 21/47202; H04N 7/17318;
(Continued)

(56) References Cited

U.S. PATENT DOCUMENTS

| 5,513,260 A | 4/1996 | Ryan |
| 5,577,135 A | 11/1996 | Grajski et al. |

(Continued)

FOREIGN PATENT DOCUMENTS

| CN | 101325687 A | 12/2008 |
| CN | 101589617 A | 11/2009 |

(Continued)

OTHER PUBLICATIONS

D. G. Lowe, "Object Recognition from Local Scale-Invariant Features", in International Conference on Computer Vision, vol. 2, 1999, pp. 1-8.

(Continued)

*Primary Examiner* — Annan Q Shang
(74) *Attorney, Agent, or Firm* — Lowenstein Sandler LLP (57) ABSTRACT

An apparatus and method for using a server to generate per-user manifest files for providing unique viewing experiences and proxy modules local to video players receiving the manifest files for measuring video playback events with frame accuracy is disclosed. In one aspect, a server may be used to generate a manifest file for directing a video player to play requested video content in a video stream with advertising or other alternative content which may be desired. A proxy module local to the video player may parse the video stream to inject triggers at frame accurate locations which may be desired for measuring, such as at a precise frame in which the alternative content starts, stops, and/or reaches a midpoint with respect to the requested video content.

20 Claims, 6 Drawing Sheets

(51) Int. Cl.
   *H04N 21/845*    (2011.01)
   *H04N 21/258*    (2011.01)
   *H04L 29/06*     (2006.01)
   *H04N 21/858*    (2011.01)
   *H04N 21/2668*   (2011.01)
   *H04N 21/262*    (2011.01)
   *H04L 29/08*     (2006.01)
   *H04N 21/235*    (2011.01)

(52) U.S. Cl.
   CPC .......... *H04L 67/1097* (2013.01); *H04L 67/28* (2013.01); *H04N 21/234* (2013.01); *H04N 21/2353* (2013.01); *H04N 21/23418* (2013.01); *H04N 21/25891* (2013.01); *H04N 21/2668* (2013.01); *H04N 21/26258* (2013.01); *H04N 21/8456* (2013.01); *H04N 21/8586* (2013.01)

(58) Field of Classification Search
   CPC . H04N 7/17309; H04N 7/173; H04N 7/17336
   USPC ................................... 725/91–93, 114–116
   See application file for complete search history.

(56) References Cited

U.S. PATENT DOCUMENTS

| | | |
|---|---|---|
| 5,659,613 A | 8/1997 | Copeland et al. |
| 5,668,603 A | 9/1997 | Copeland |
| 5,721,788 A | 2/1998 | Powell et al. |
| 5,883,959 A | 3/1999 | Kori |
| 5,917,943 A | 6/1999 | Washizawa |
| 6,018,374 A | 1/2000 | Wrobleski |
| 6,026,189 A | 2/2000 | Greenspan |
| 6,173,275 B1 | 1/2001 | Caid et al. |
| 6,373,960 B1 | 4/2002 | Conover et al. |
| 6,381,367 B1 | 4/2002 | Ryan |
| 6,404,925 B1 | 6/2002 | Foote et al. |
| 6,438,275 B1 | 8/2002 | Martins et al. |
| 6,539,395 B1 | 3/2003 | Gjerdingen et al. |
| 6,711,293 B1 | 3/2004 | Lowe |
| 6,774,917 B1 | 8/2004 | Foote et al. |
| 6,785,815 B1 | 8/2004 | Serret-Avila et al. |
| 6,937,766 B1 | 8/2005 | Wilf et al. |
| 6,975,746 B2 | 12/2005 | Davis et al. |
| 6,975,755 B1 | 12/2005 | Baumberg |
| 7,043,019 B2 | 5/2006 | Tehranchi et al. |
| 7,055,169 B2 | 5/2006 | Delpuch et al. |
| 7,167,574 B2 | 1/2007 | Kim |
| 7,177,470 B2 | 2/2007 | Jasinschi et al. |
| 7,185,201 B2 | 2/2007 | Rhoads et al. |
| 7,218,754 B2 | 5/2007 | Schumann et al. |
| 7,272,240 B2 | 9/2007 | Goldberg et al. |
| 7,298,930 B1 | 11/2007 | Erol et al. |
| 7,325,013 B2 | 1/2008 | Caruso |
| 7,421,376 B1 | 9/2008 | Caruso et al. |
| 7,650,361 B1 * | 1/2010 | Wong ................. H04N 21/4722 707/999.107 |
| 8,160,366 B2 | 4/2012 | Nakamura et al. |
| 8,200,021 B2 | 6/2012 | Iwamoto et al. |
| 8,515,212 B1 | 8/2013 | Bengio et al. |
| 8,515,241 B2 | 8/2013 | Forsyth et al. |
| 8,607,283 B2 | 12/2013 | Civanlar et al. |
| 8,677,428 B2 * | 3/2014 | Lewis ............... H04N 21/44016 725/36 |
| 8,887,215 B2 | 11/2014 | Fisher et al. |
| 8,943,215 B2 | 1/2015 | Patten et al. |
| 9,015,151 B1 * | 4/2015 | Margulis .............. G06Q 30/0269 705/14.52 |
| 9,066,115 B1 | 6/2015 | Cherry et al. |
| 9,066,138 B1 | 6/2015 | Kraiman et al. |
| 9,084,030 B1 * | 7/2015 | Nijim .................. H04N 21/441 |
| 9,167,278 B2 * | 10/2015 | Sinha .................. H04H 60/40 |
| 9,491,499 B2 * | 11/2016 | Wagenaar .......... H04N 21/26258 |
| 9,613,042 B1 | 4/2017 | Joseph et al. |
| 10,104,137 B2 | 10/2018 | Salomons |
| 10,148,716 B1 * | 12/2018 | Joseph .................... G06F 16/16 |
| 2002/0159641 A1 | 10/2002 | Whitney et al. |
| 2003/0005454 A1 | 1/2003 | Rodriguez et al. |
| 2003/0033347 A1 | 2/2003 | Bolle et al. |
| 2003/0045954 A1 | 3/2003 | Weare et al. |
| 2003/0151621 A1 * | 8/2003 | McEvilly ............ H04N 7/17318 715/744 |
| 2003/0195883 A1 | 10/2003 | Mojsilovic et al. |
| 2003/0229900 A1 * | 12/2003 | Reisman ............... G06F 16/954 725/87 |
| 2004/0022447 A1 | 2/2004 | Mukhopadhyay et al. |
| 2004/0085339 A1 | 5/2004 | Divakaran et al. |
| 2004/0221237 A1 | 11/2004 | Foote et al. |
| 2004/0260786 A1 | 12/2004 | Barile |
| 2005/0125368 A1 | 6/2005 | Akahori |
| 2005/0251532 A1 | 11/2005 | Radhakrishnan et al. |
| 2005/0262245 A1 * | 11/2005 | Menon .............. H04N 21/23103 709/226 |
| 2005/0278736 A1 * | 12/2005 | Steelberg ........... H04N 21/2547 725/34 |
| 2005/0289347 A1 | 12/2005 | Ovadia |
| 2006/0029253 A1 | 2/2006 | Pace |
| 2006/0101060 A1 | 5/2006 | Li et al. |
| 2006/0111801 A1 | 5/2006 | Weare et al. |
| 2006/0271973 A1 * | 11/2006 | Jerding .............. H04N 5/44543 725/86 |
| 2006/0279628 A1 * | 12/2006 | Fleming ............... G11B 27/034 348/143 |
| 2006/0291690 A1 | 12/2006 | Roberts |
| 2007/0025606 A1 | 2/2007 | Gholap et al. |
| 2007/0128899 A1 * | 6/2007 | Mayer .................. G06F 9/4406 439/152 |
| 2007/0157231 A1 | 7/2007 | Eldering et al. |
| 2007/0217676 A1 | 9/2007 | Grauman et al. |
| 2007/0253594 A1 | 11/2007 | Lu et al. |
| 2007/0282898 A1 * | 12/2007 | Stark ...................... H04H 20/10 |
| 2008/0027931 A1 | 1/2008 | Lu et al. |
| 2008/0040807 A1 | 2/2008 | Lu et al. |
| 2008/0123976 A1 | 5/2008 | Coombs et al. |
| 2008/0166057 A1 | 7/2008 | Nakajima |
| 2008/0186413 A1 | 8/2008 | Someya et al. |
| 2008/0271080 A1 | 10/2008 | Gossweiler et al. |
| 2009/0074235 A1 | 3/2009 | Lahr et al. |
| 2009/0089838 A1 * | 4/2009 | Pino, Jr. ............. H04N 21/4788 725/40 |
| 2009/0113512 A1 * | 4/2009 | Collet .................... H04N 7/173 725/132 |
| 2009/0193473 A1 | 8/2009 | Moon et al. |
| 2009/0204901 A1 * | 8/2009 | Dharmaji ................ G06Q 30/02 715/745 |
| 2009/0324026 A1 | 12/2009 | Kletter |
| 2010/0138865 A1 * | 6/2010 | Rai ...................... H04N 21/482 725/44 |
| 2010/0162330 A1 | 6/2010 | Herlein et al. |
| 2010/0299438 A1 * | 11/2010 | Zimmerman ...... H04N 7/17318 709/226 |
| 2011/0078551 A1 * | 3/2011 | Zhang .................... H04H 60/25 715/229 |
| 2011/0191692 A1 * | 8/2011 | Walsh .................... G06F 3/00 715/752 |
| 2011/0219035 A1 | 9/2011 | Korsunsky et al. |
| 2011/0314493 A1 * | 12/2011 | Lemire ............ H04N 21/23424 725/32 |
| 2012/0159337 A1 * | 6/2012 | Travilla .............. G06Q 30/0631 715/738 |
| 2012/0216121 A1 | 8/2012 | Lin et al. |
| 2012/0240176 A1 | 9/2012 | Ma et al. |
| 2012/0275597 A1 | 11/2012 | Knox et al. |
| 2013/0163758 A1 | 6/2013 | Swaminathan et al. |
| 2013/0195204 A1 | 8/2013 | Reznik et al. |
| 2013/0291002 A1 | 10/2013 | Rothschild et al. |
| 2013/0311780 A1 | 11/2013 | Besehanic |
| 2014/0095890 A1 * | 4/2014 | Mangalore ............... G06F 21/10 713/189 |
| 2014/0115060 A1 * | 4/2014 | Kim ...................... H04L 65/4076 709/204 |
| 2014/0201334 A1 | 7/2014 | Wang et al. |

(56) References Cited

U.S. PATENT DOCUMENTS

| | | |
|---|---|---|
| 2014/0259051 A1* | 9/2014 | Strein ................ H04N 21/4305 725/32 |
| 2014/0280781 A1 | 9/2014 | Gregotski |
| 2015/0058709 A1 | 2/2015 | Zaletel |
| 2015/0074232 A1 | 3/2015 | Phillips et al. |
| 2015/0113021 A1* | 4/2015 | Martin .................. G06F 16/683 707/796 |
| 2015/0172342 A1 | 6/2015 | Yin |
| 2015/0208103 A1 | 7/2015 | Guntur et al. |
| 2015/0346832 A1 | 12/2015 | Cole et al. |
| 2015/0365622 A1 | 12/2015 | Ushiyama |
| 2015/0365725 A1 | 12/2015 | Belyaev et al. |
| 2015/0382042 A1* | 12/2015 | Wagenaar ........ H04N 21/26258 725/34 |
| 2016/0065946 A1 | 3/2016 | Cole et al. |
| 2016/0080470 A1* | 3/2016 | Shanson ............. H04L 65/4084 709/219 |
| 2016/0080810 A1 | 3/2016 | Dutta et al. |
| 2016/0127260 A1 | 5/2016 | Gordon |
| 2016/0127440 A1 | 5/2016 | Gordon |
| 2016/0134910 A1* | 5/2016 | Davis ....................... H04N 5/76 725/27 |
| 2016/0149699 A1 | 5/2016 | Gauda |
| 2016/0173961 A1* | 6/2016 | Coan .................... H04N 21/812 725/32 |
| 2016/0198202 A1 | 7/2016 | Van Brandenburg et al. |
| 2016/0224799 A1 | 8/2016 | Uzun et al. |
| 2016/0227279 A1 | 8/2016 | Fang et al. |
| 2016/0316233 A1* | 10/2016 | Ghadi .............. H04N 21/26258 |
| 2016/0337704 A1 | 11/2016 | Binder et al. |
| 2017/0064400 A1 | 3/2017 | Riegel et al. |
| 2017/0070758 A1* | 3/2017 | Phillips .............. H04N 21/2385 |
| 2017/0085933 A1* | 3/2017 | Czeck, Jr. .......... H04N 21/2668 |
| 2017/0150190 A1 | 5/2017 | Tarbox et al. |
| 2017/0280181 A1* | 9/2017 | Ramaley ............. H04L 65/4084 |
| 2017/0302753 A1 | 10/2017 | Larumbe et al. |
| 2017/0308681 A1 | 10/2017 | Gould et al. |
| 2017/0353516 A1 | 12/2017 | Gordon |
| 2018/0063594 A1 | 3/2018 | Alexander et al. |

FOREIGN PATENT DOCUMENTS

| | | |
|---|---|---|
| CN | 101689184 A | 3/2010 |
| CN | 103491457 A | 1/2014 |
| WO | 2006/122320 | 11/2006 |
| WO | 2007/148290 | 12/2007 |

OTHER PUBLICATIONS

K. Mihcak and R. Venkatesan, "Blind Image Watermarking Via Derivation and Quantization of Robust Semi-Global Statistics", in IEEE International Conference on Acoustics, Speech and Signal Processing, 2002, (4 pages).

T. Lindeberg, "Feature Detection with Automatic Scale Selection", International Journal of Computer Vision, vol. 30, No. 2, 1998, pp. 1-51.

A. An Doni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

International Search Report for PCT Patent Application No. PCT/US17/31991 dated Sep. 21, 2017, 21 pages.

Chinese Patent Application No. 201780011326.6, Office Action dated Mar. 9, 2020, 6 pages.

Chinese Patent Application No. 201780011328.5, Office Action dated Mar. 9, 2020, 8 pages.

* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 4

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDlJ6Q==?anvack=nbcu_n
bcd_watchvod_ios_qa_c23d2809ee27249f2a757537da68d17d",IV=0xE0F48617C65F9D00ACC4B47D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDlJ6Q==?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDlJ6Q==?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDlJ6Q==?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDlJ6Q==?anvack=nbcu_nbcd_wa
tchvod_ios_qa_ c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

SYSTEM FOR MEASURING VIDEO PLAYBACK EVENTS USING A SERVER GENERATED MANIFEST/PLAYLIST

CROSS-REFERENCE TO RELATED APPLICATIONS

This application claims priority to U.S. Provisional Patent Application No. 62/334,143, entitled "Method and Apparatus for Tracking Video Playback Events Using a Server Generated Manifest/Playlist," and U.S. Provisional Patent Application No. 62/334,221, entitled "Method and Apparatus for In-Band Metadata Tunneling for Frame Accurate Downstream Video Player Control," each filed on May 10, 2016, which are herein incorporated by reference.

BACKGROUND

The subject matter disclosed herein relates to a method for measuring video playback events during video streaming which may be unique to each user. More specifically, a method and apparatus for using a server to generate per-user manifest files for providing unique viewing experiences and proxy modules local to video players receiving the manifest files for measuring video playback events with frame accuracy is disclosed.

Video streaming allows video content to be delivered to a video player via the Internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each encoded video signal, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided via to multiple CDNs, the CDNs may be in different geographic locations, such as the West Coast, East Coast or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

As is further known to those skilled in the art, it is often desirable to integrate advertising or other alternative content with requested video content in order, for example, to produce revenue which may ultimately support the requested video content. To ensure the effectiveness of such alternative content, it is often desirable by producers of the alternative content to require the video player to measure various aspects of the alternative content being displayed. This may be accomplished, for example, via metadata provided with the alternative content for instructing the video player. Such aspects for measuring may include, for example, the precise time in which the alternative content starts, stops, and/or reaches a midpoint with respect to the requested video content, a Uniform Resource Locator (URL) address for the video player, and so forth. One example of a standard for communication between a server and video player for measuring such aspects of alternative content is the Video Ad Serving Template (VAST) specification released by the Interactive Advertising Bureau (IAB).

In addition, as is further known to those skilled in the art, it is often desirable to provide unique viewing experiences to users viewing the same requested video content. For example, although different users may request to view identical video content, such as an episode of a television show or a movie, the users may be in entirely different geographic locations and/or may have entirely different viewing histories. Such differences may make the display of certain alternative content much more desirable than other alternative content. The desire to providing unique viewing experiences for users while also ensuring the effectiveness of alternative content by measuring the various aspects of the alternative content being displayed creates a significant technological challenge.

In addition, the owner or distributor of the video content may desire to provide other information to the user, such as a title of a show, programming change information, breaking news, or the like. However, such information may be geographic specific and it may be undesirable to provide the content within the video stream to all users. Still other information may not be available directly to the content provider. Rather than including such information in the video stream, a trigger is embedded within the video content alerting the video player of the presence of such content. Upon receiving the trigger, the video player makes a pull-request to a content server outside, or out-of-band, of the video stream. The content server returns the appropriate content for the video player to display along with the video stream.

However, out-of-band requests made by individual video players result in the metadata being displayed at different times with respect to the video content being delivered. Different video players are connected to the CDN via networks having different bandwidths, different switching devices and the like that result in varying transmission delays. Similarly, the video players are connected to the content server via networks having different bandwidths, different switching devices and the like that result in varying transmission delays. Thus, the delivery of the video content from the CDN and the delivery of content indicated from the metadata happen asynchronously, and the content indicated by the metadata, therefore, cannot be displayed synchronized with a particular frame of the video transmission. Therefore, it would be desirable to provide a system with frame accurate playback of metadata.

Historically, metadata has been used in large part to identify programming, segments of video, commercial breaks and the like. These inserted data were based on the television model in which a passive user watches video presented by the content provider. However, streaming video services provide a more interactive experience. The video content may be provided on a computer, mobile phone, or other device which provides user input. Thus, it would be desirable to provide a system which allows insertion of interactive metadata, requiring or soliciting a response from a user of the video device.

BRIEF DESCRIPTION OF THE DISCLOSURE

The subject matter disclosed herein describes an apparatus and method for using a server to generate per-user manifest files for providing unique viewing experiences and proxy modules local to video players receiving the manifest files for measuring video playback events with frame accuracy. In one aspect, a server may be used to generate a manifest file for directing a video player to play requested video content in a video stream with advertising or other alternative content which may be desired. A proxy module local to the video player may parse the video stream to inject triggers at frame accurate locations which may be desired for measuring, such as at a precise frame in which the alternative content starts, stops, and/or reaches a midpoint with respect to the requested video content. The proxy module may redirect the video player to the parsed and injected (modified) video stream so that the video player produces a detectable event at each trigger which may be measured by a server.

An apparatus or method capable of frame accurate playback of metadata and that allows insertion of interactive metadata in a video stream is also disclosed. A video manager is in communication with an encoder to inject metadata in a video stream. In one embodiment, the video manager may receive a trigger inserted in the video stream by the content provider and retrieve metadata from a content server corresponding to the trigger. In another embodiment, the video manager may further include a user interface operative to receive metadata from a third party. The video manager may then insert the metadata into the video stream at a desired frame location for delivery to a video player.

In one embodiment, a system for managing video playback may comprise: a manifest server configured to communicate with a video player and a content delivery network, the manifest server executing a program stored in a non-transient medium operable to: (a) receive a request from a video player for playing a video stream comprising requested content; (b) upon receiving the request: (i) communicate with a first content delivery network to obtain a first manifest file containing information for allowing a video player to play the requested content; and (ii) communicate with a second content delivery network to obtain information for allowing a video player to play alternative content and produce a detectable event in connection with the alternative content; and (c) modify the first manifest file to produce a second manifest file unique to the video player having the request, the second manifest file containing information for allowing the video player to play the requested content and the alternative content and produce the detectable event.

According to another embodiment, a method for managing video playback using a manifest server configured to communicate with a video player and a content delivery network may comprise: (a) receiving a request from a video player for playing a video stream comprising requested content; (b) upon receiving the request: (i) communicating with a first content delivery network to obtain a first manifest file containing information for allowing a video player to play the requested content; and (ii) communicating with a second content delivery network to obtain information for allowing a video player to play alternative content and produce a detectable event in connection with the alternative content; and (c) modifying the first manifest file to produce a second manifest file unique to the video player having the request, the second manifest file containing information for allowing the video player to play the requested content and the alternative content and produce the detectable event.

According to another embodiment, a system for managing video playback may comprise: an encoder configured to convert video content from a content provider to a segmented video stream for delivery to a video player; and a video manager in communication with the encoder, the video manager executing a program stored in a non-transient medium operable to: (a) receive metadata for insertion into a video stream; and (b) insert the metadata at a desired frame location within the video stream.

These and other objects, advantages, and features of the disclosure will become apparent to those skilled in the art from the detailed description and the accompanying drawings. It should be understood, however, that the detailed description and accompanying drawings, while indicating various embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various embodiments of the subject matter disclosed herein are illustrated in the accompanying drawings in which like reference numerals represent like parts throughout, and in which:

FIG. 3A is a video signal divided into video segments.

FIG. 4 is a segment of a manifest file describing the bandwidths of the available streams for the streaming video content and the location of each stream according to one embodiment of the disclosure;

FIG. 5 is a segment of a manifest file including a portion of a playlist according to one embodiment of the disclosure;

In describing the various embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE DISCLOSURE

The various features and advantageous details of the subject matter disclosed herein are explained more fully with reference to the non-limiting embodiments described in detail in the following description.

Figure 1:
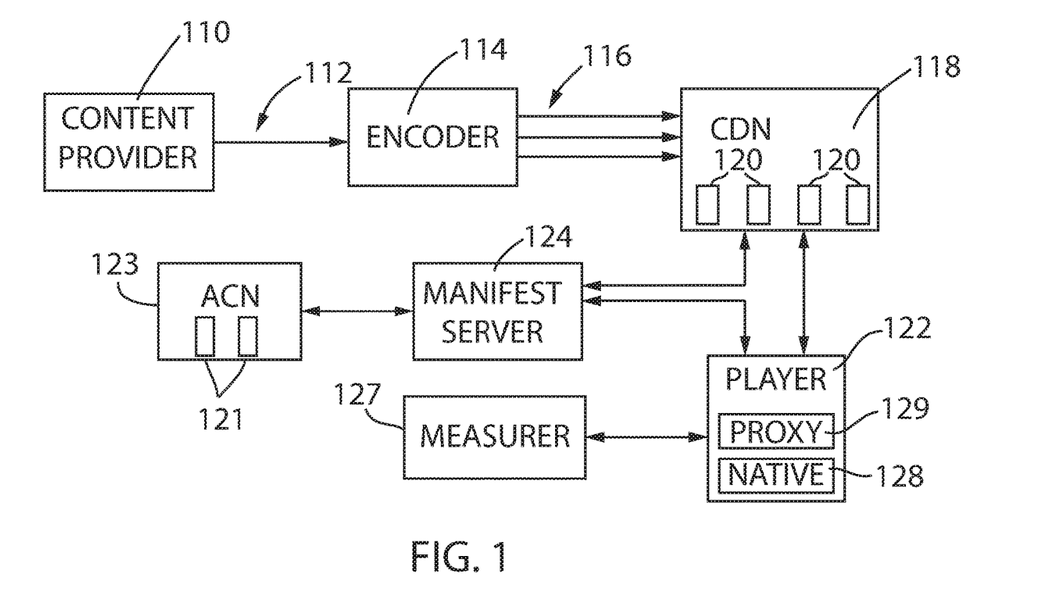
FIG. 1 is a block diagram representation of an environment incorporating the method for measuring video playback using manifest files generated by a server of the present disclosure.

Turning initially to FIG. 1, one environment for measuring video playback using manifest files generated by a server is illustrated. A content provider 110 generates a video signal 112 to be distributed to video consumers. The video signal may be provided in an uncompressed file format, such as a SDI format, or in a compressed format, such as an MPEG or TS file format. The video signal 112 is sent to an encoder 114 which converts the file into a live streaming signal 116. The live streaming signal 116 is preferably a segmented data stream that may be transmitted using standard HTTP or HTTPS protocol over the internet. The live streaming signal 116 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder 114 generates a single manifest file for each encoded video signal, where the manifest file is distributed along with the streaming signal 116 and stored on a CDN 118. Each CDN 118 includes a number of edge servers 120 which store the encoded video signal 116 and manifest file until playback of the video content is requested by a video player 122. Although the embodiment illustrated in FIG. 1 shows a single CDN 118, it is contemplated that the encoded video signal 116 may be stored on multiple CDNs 118. The manifest file may include an address of each CDN such that playback may occur from any of the CDNs 118.

As further illustrated in FIG. 1, the environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the video player 122. Each video player 122 also includes a proxy module 129. The proxy module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, in one aspect, when a user 125 requests video content for playback on the video player 122, the native video player module 128 may communicate with the proxy module 129 and, in turn, with the manifest server 124 (rather than the CDN 118) to obtain the manifest files for video playback. The manifest server 124 manages the retrieval and delivery of the manifest file generated by the encoder 114 to provide the unique manifest file to each video player 122.

As further illustrated in FIG. 1, the environment may also include one or more Alternative Content Networks (ACN) 123 and/or an alternative content measurer 127. Alternative content, such as commercial advertisements and the like, may be stored in the ACN 123. Although the embodiment illustrated in FIG. 1 shows a single ACN 123, it is contemplated that alternative content may be stored on multiple ACNs 123 in different geographic locations. Each ACN 123 may include a number of edge servers 121 which may store a streaming signal for the alternative content until requested by the manifest server 124. The manifest server 124 may select an ACN 123 based, among other things, on its geographic proximity in order to reduce transmission latencies. The alternative content measurer 127 may be in communication with the video player 122 for measuring detectable events reported by the video player 122 in the video stream, such as triggers that are injected in relation to the alternative content, for a measuring server.

Figure 2:
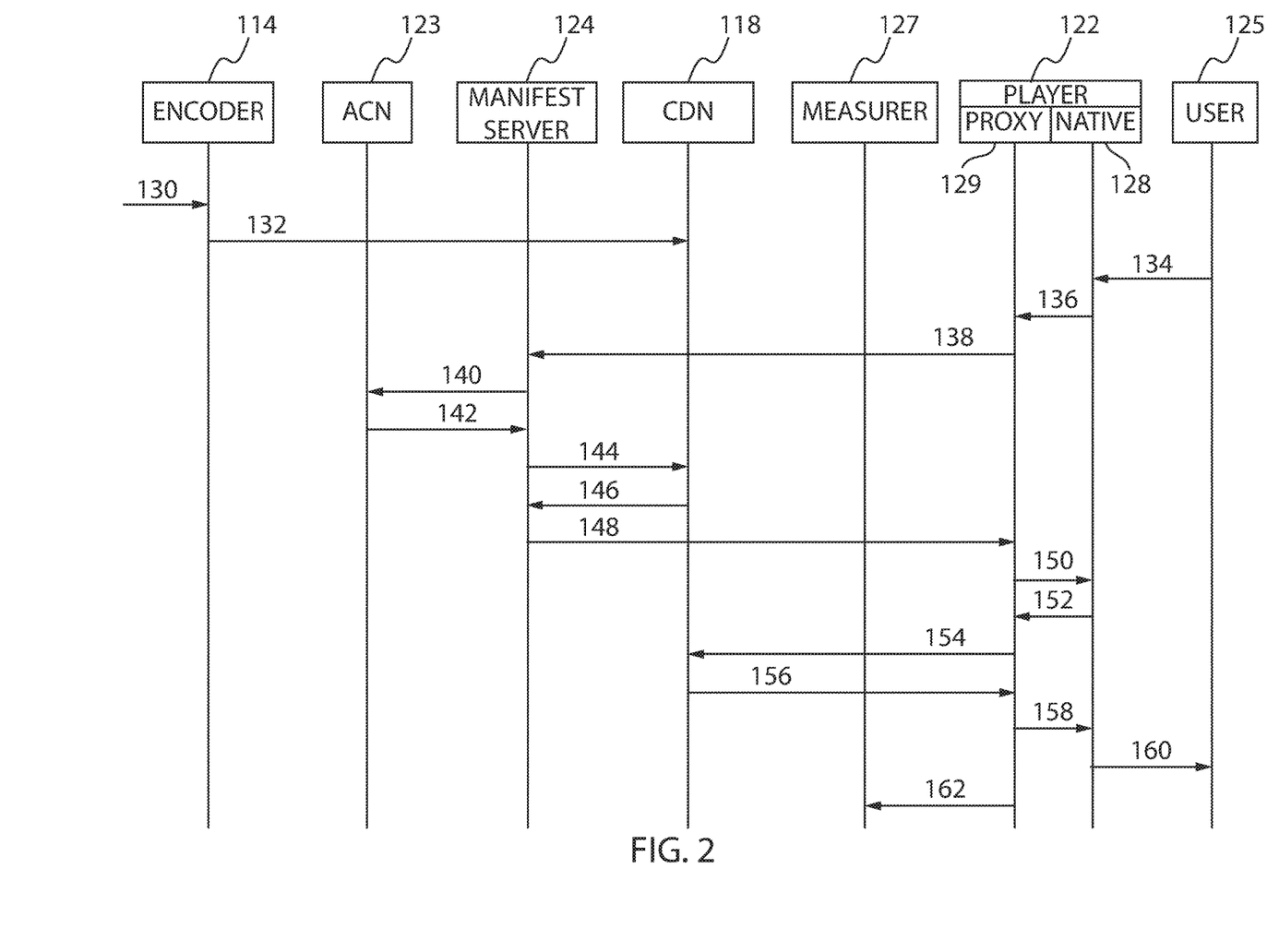
FIG. 2 is a flow diagram illustrating the measuring of video playback using manifest files generated by a server according to one embodiment of the disclosure.
Figure 3A:
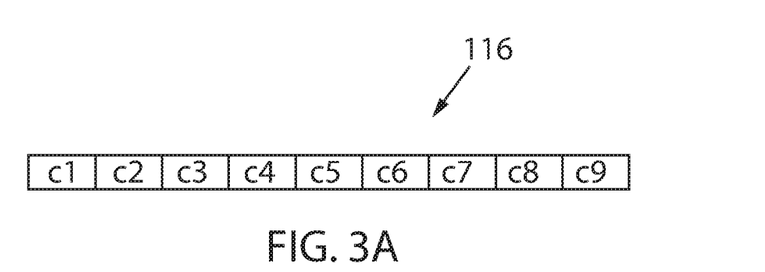

Turning next to FIG. 2, the operations performed to measure video playback using manifest files generated by a server are illustrated. At block 130, the encoder 114 receives the initial video signal 112. It is contemplated that this video signal 112 may be a pre-recorded signal, such as an episode of a television show or a movie, or the video signal 112 may be a live stream, for example, of a sporting event, concert, or news feed. The encoder 114 converts the original video signal into a live streaming signal 116 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet. Referring briefly to FIG. 3A, a video signal 116 from the encoder 114, shown by way of example, may consist of video content being divided into nine segments of requested video content, illustrated as "c1," "c2," "c3," and so forth, with each segment being 10 seconds in length for a net content length of 90 seconds. After generating the video signal 116 into segments (also referred to as requested video content), the video signal and a manifest file are transmitted to the CDN 118 for storage in one of the edge servers 120, as shown in block 132.

At block 134, a user 125 then requests playback of a desired video segment on the video player 122 via the native video player module 128. The video player 122 may be any suitable electronic device to receive the streaming signal 116 such as a desktop computer, a television, a laptop computer, a tablet, Wi-Fi enabled device connected to a video screen, or a mobile phone. At block 136, the native video player module 128, in turn, requests a manifest file from the proxy module 129 in order to retrieve the information necessary to play the requested video content.

At block 138, the proxy module 129, in turn, requests the manifest file from the manifest server 124. When the video player 122 requests the manifest file from the manifest server 124 a connection is established between the devices. A session identifier may also be generated to identify the connection. The session identifier may be generated by the video player 122 or the manifest server 124. For purposes of illustration, it may be assumed that the session identifier may be generated by the video player 122. The session identifier may be transmitted to the manifest server 124 by the video player 122 when requesting a manifest file.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. However, because the manifest server 124 is providing a unique manifest file to each player, the manifest file may include identifying information of the video player 122, the user 125 of the video player, or a combination thereof. Further, the manifest file may be modified to include content specific for the user 125.

At block 140, the manifest server 124 communicates with the ACN 123 to request alternative content which may apply to the user 125 and/or the video player 122. Such alternative content may depend, for example, on the geographic location and/or viewing history of the user 125 and/or the video player 122, among other things. The alternative content may be used, for example, to provide advertisements or other alternative content at the beginning or end or during break segments of the requested video content. The manifest server 124 may request alternative content from the ACN 123 for every user session and for every display opportunity. At block 142, the ACN 123 returns the alternative content that may ultimately be stitched in the video stream for the video player 122.

To ensure the effectiveness of the alternative content, the alternative content may include a payload (alternative content payload information) containing specific event triggers and/or request for corresponding user-session specific data for measuring the alternative content at the video player 122. This may be accomplished, for example, via metadata provided with the alternative content for instructing the video player 122 to respond. Such event triggers may include, for example, triggering the video player 122 to respond at a precise time in which a frame of the alternative content starts, stops, and/or reaches a midpoint with respect to the requested video content, to respond with a URL address for the video player 122, and so forth.

Next, at block 144, the manifest server 124 communicates with the CDN 118, and at block 146, the latest manifest file corresponding to the particular user's request is loaded from the CDN 118. The manifest server 124 may periodically load updates for the manifest file from the CDN 118 as may be required. At block 146, the CDN 118 provides the manifest file and/or updates to the manifest server 124. In turn, the manifest server 124 processes the manifest file from the CDN 118 to determine suitable positions for stitching alternative content. In one aspect, such positions may be predetermined in the manifest file by the encoder 114.

Figure 3B:
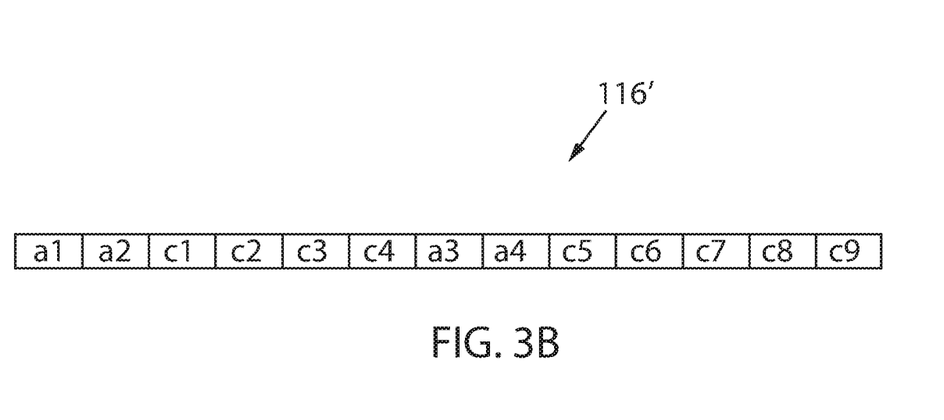
FIG. 3B is a modified video signal stitched to include alternative content segments, each according to an embodiment of the disclosure.

Accordingly, the manifest server 124 updates the manifest file to include alternative content segments in the video stream as appropriate. For example, referring briefly to FIG. 3B, with a customized manifest file generated, the video signal 116 may be reconfigured for playback as a modified video signal 116' including two segments of alternative content, illustrated as "a1" and "a2, followed by four segments of requested video content, illustrated as "c1," "c2, "c3" and "c4, followed by another two segments of alternative content, illustrated as "a2" and "a3, and followed by another four segments of requested video content, illustrated as "c5," "c6, "c7" and "c8." With segments being 10 seconds in length, the modified video signal 116' may then have a gross content length of 130 seconds. This stitched video stream may reflect, for example, enforcement of a logic rule by the manifest server 124 requiring initial viewing of a first advertisement and a midstream viewing of a second advertisement for a first time viewing of the requested video content at the video player 122. Each time the user 125 plays a video, the video player 122 may obtain an updated manifest file from the manifest server 124. The manifest server 124 may individually measure a status of the video player 122 and the user view experiences.

With reference also to FIGS. 4 and 5, segments of manifest files are illustrated that illustrate a portion of the content that may be available in a manifest file. The manifest file is a text file and the particular content on each line of the text file is identified by the directive at the start of the line. For example, FIG. 4 identifies four different streams in the streaming signal 116 where each stream has a different bandwidth. The location of a playlist for each of the streams is also included in the manifest file. FIG. 5 is another manifest file which contains a portion of the playlist of a video segment. Each line may identify a particular video segment between 1 and 5 (i.e., the "−1", "−2", etc. . . . prior to the .ts file extension), and provides the location of video segment in the CDN 118. The manifest file may include any information corresponding to the video stream, such as metadata information for the video stream.

In addition, while segments of manifest file are updated to provide alternative content, the aforementioned alternative content payload for measuring may also be added to the manifest file. Referring again to FIG. 2, at block 148, the manifest server 124 transmits the updated manifest file to the proxy module 129.

Next, at block 150, the proxy module 129 parses the updated manifest file and extracts the alternative content payload information for measuring and stores this information in memory. The proxy module 129 then determines a frame position for the start of each alternative content segment. The proxy module 129 may utilize the updated manifest file to modify the video stream accordingly, such as by replacing the video segments (TS file location) in the manifest file with a proxy location for the video segments (TS proxy file location) provided by the proxy module 129. As a result, when the video player 122 makes a request for the video stream, the video segments at the proxy location may be provided. In addition, while replacing the video segments, the alternative content payload information for measuring, including metadata, position information, and the like, or references to such information, may be included as well. This newly updated manifest file, manipulated by proxy module 129 with the video segments at the proxy location, is then sent to the native video player module 128.

At block 152, upon receiving a manifest file pursuant to its request, the native video player module 128 may then request the video segments to display. As the manifest file now includes a proxy location for the video segments, the native video player module 128 will request the video segments from the proxy module 129.

At block 154, the proxy module 129 communicates with the CDN 118 to request video content segments; and at block 156, the proxy module 129 loads the video content segments from the CDN 118. Before the video content segments are sent to the native video player module 128, the proxy module 129 may re-package the video content segments with the alternative content segments and may inject frame accurate triggers, such as according to the ID3 standard for metadata, to form the video stream. These triggers may be set for measuring the alternative content segments, or references to the alternative content segments, with the alternative content payload information by triggering on events such as the video player 122 displaying a start, stop, and/or midpoint frame of alternative segments. Accordingly, the proxy module 129 may load the video stream (TS file) with the video content segments, alternative content segments and frame accurate triggers corresponding to the alternative content payload information.

At block 158, the proxy module 129 provides the video stream to the native video player module 128 which, in turn, plays the video stream to the user 125. Upon playback, the video player 122 will trigger upon the predetermined frame triggers which have been injected according to the alternative content payload information. These triggers may result in detectable events which may be measured by a server for measuring information about the video player 122 playing the video stream.

At block 160, the video player 122, via the native video player module 128, may play the video stream for the user 125. The user 125, in turn, may further interact with the video player 122, such as to seek forward or backward in the video stream, request a new video content, and the like. In addition, at block 162, the video player 122, via the proxy module 129, may trigger upon detectable events, such as the frame accurate triggers corresponding to the alternative content payload information, as the video stream is being played. Such detectable events may be measured by one or more servers or other utilities, such as the alternative content measurer 127.

Figure 6:
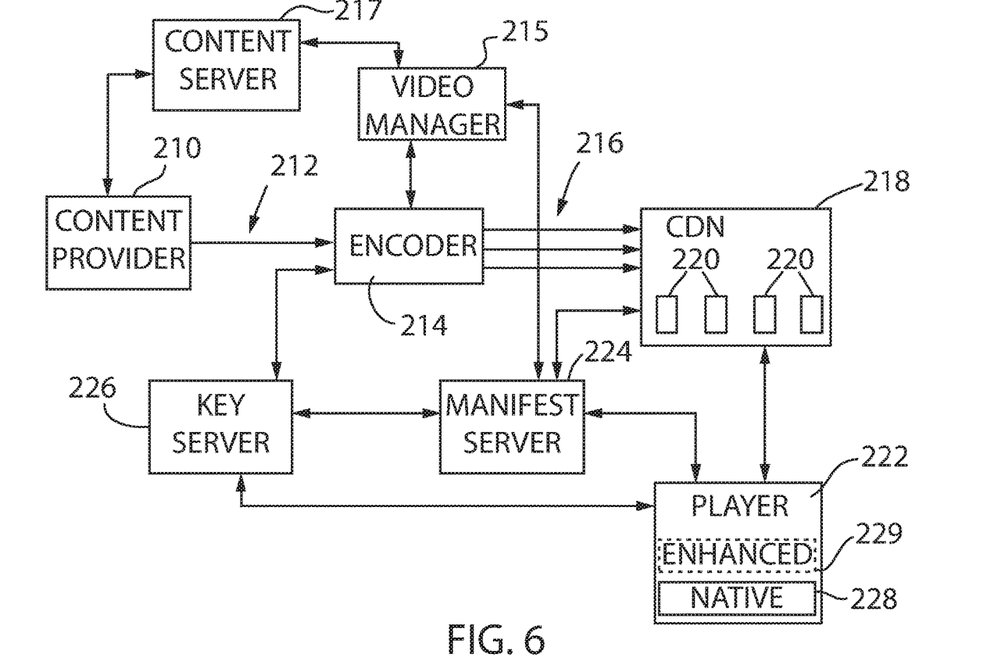
FIG. 6 is a block diagram representation of an environment for delivering streaming video with per-user manifest generation.

Turning next to FIG. 6, according to another aspect of the disclosure, a content provider 210 generates a video signal 212 to be distributed to video consumers. The video signal may be provided in an uncompressed file format, such as a SDI format, or in a compressed format, such as an MPEG or TS file format. The video signal 212 is sent to an encoder 214 which converts the file into a live streaming signal 216. The live streaming signal 216 is preferably a segmented data stream that may be transmitted using standard HTTP or HTTPS protocol over the internet. The live streaming signal 216 may include multiple streams, where each stream may have a different data rate and/or different resolution. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 222 to play the segmented data stream such as the data rate and resolution of each stream and a playlist providing an address from which the video content may be retrieved. The encoder 214 generates a single manifest file for each encoded video signal, where the manifest file is distributed along with the streaming signal 216 and stored on a CDN 218. It is noted that the "single" manifest file refers to a common or identical manifest file for each encoded signal. The manifest file may be comprised of multiple data files stored on the CDN where each manifest file contains a portion of the data required to playback the streaming signal. Further, for live streaming video, the manifest file may be updated and retransmitted at a periodic interval as new content is added from the live event. Although multiple files are used, the content generated by the encoder 214 for delivery to each video player 222 is the same. Each CDN 218 includes a number of edge servers 220 which store the encoded video signal 216 and manifest file until playback of the video content is requested by a video player 222. Although the embodiment illustrated in FIG. 6 shows a single CDN 218, it is contemplated that the encoded video signal 216 may be stored on multiple CDNs 218. The manifest file may include an address of each CDN such that playback may occur from any of the CDNs 218.

As further illustrated in FIG. 6, the exemplary environment includes a manifest server 224. The manifest server 224 is used to provide a unique manifest file, also referred to herein as a per-user manifest file, to each video player 222 for each requested video content. Each video player 222 includes a native video player module 228 which provides an interface to a user and which manages video playback on the device 222. Some video players 222 may further include an enhanced video player module 229, illustrated as an optional module in FIG. 6. The enhanced video player module 229 may be a plug-in or other software module executing on the video player 222 that either complements (i.e., adds additional capabilities) or replaces (i.e., adds additional capabilities and incorporates the video interface and playback capabilities) the native video player module 228. As will be discussed in more detail below, when a user 225 requests video content for playback on the video device 222, the native or enhanced video player module 229 communicates with a manifest server 224 rather than the CDN 218 to obtain the manifest files for video playback. The manifest server 224 manages the retrieval and delivery of the manifest file generated by the encoder 214 to provide the unique manifest file to each video player 222.

The exemplary embodiment further includes a video manager 215 in communication with the encoder 214. The video manager 215 receives triggers included from the content provider in the video signal 212. The video manager 215 is also in communication with a content server 217 and the manifest server 224, where the content server 217 may store metadata generated by the content provider 210 and which was previously retrieved via out-of-band methods by the video player 222. According to one embodiment of the disclosure, the video manager 215 and the manifest server 224 are implemented on a single server. According to another embodiment of the disclosure, the video manager 215 and the manifest server 224 are implemented on separate servers. Because the manifest server 224 has established a per-user connection with each video player 222, as discussed in more detail below, the video manager 215 can identify content intended for individual video players 222 based on the per-user connection. Upon detecting a trigger in the video signal 212, the video manager 215 contacts the content server 217 to retrieve the metadata corresponding to the trigger that would otherwise need to be requested out-of-band by the video player 222. The metadata may be universal to all video players 222 or may be tailored, for example, to a geographic region or to a particular video player 222. Having retrieved the information, the video manager communicates the information to the encoder 214 where it may be included within the transport stream for delivery directly to the video player. Insertion of the information into the video stream is discussed in more detail below.

Figure 7:
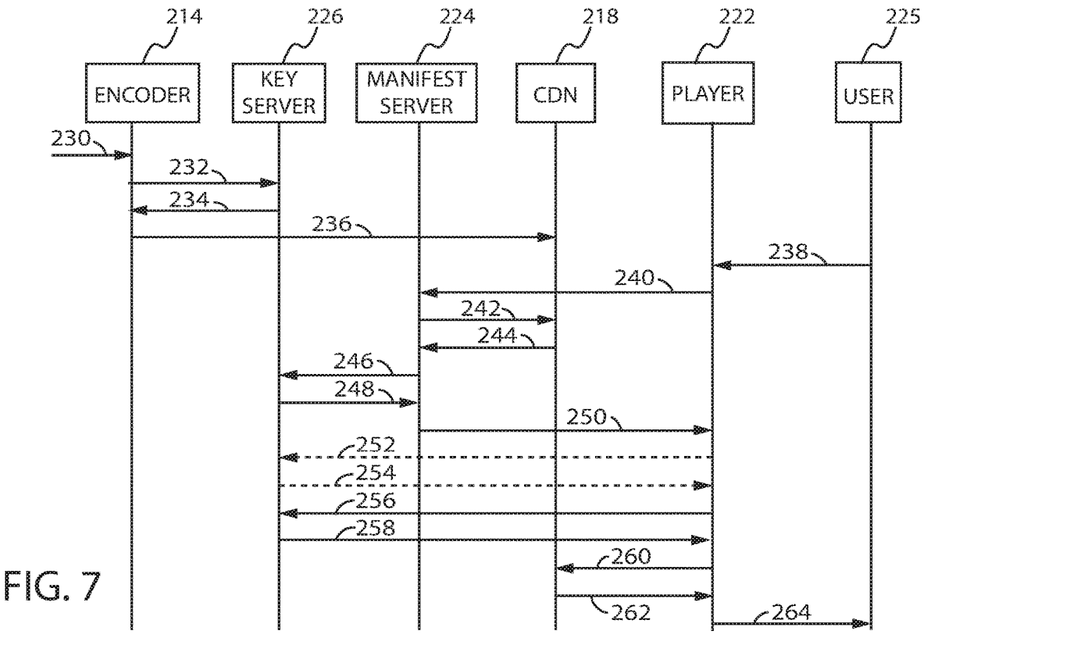
FIG. 7 is a flow diagram illustrating per-user video manifest generation and playback.

Turning next to FIG. 7, the operations performed to create, deliver, and playback a per-user manifest file are illustrated. At block 230, the encoder 214 receives the initial video signal 212. It is contemplated that this video signal 212 may be a pre-recorded signal, such as an episode of a television show or a movie, or the video signal 212 may be a live stream, for example, of a sporting event, concert, or news feed. The encoder 214 converts the original video signal into a live streaming signal 216 suitable for delivery via HTTP or HTTPS. One operation in converting the video signal is to divide the video signal into segments. The segments may be, for example, 10 seconds in length. Optionally, other segment lengths, for example, from 1 second up to 10 seconds may be selected. The length of the video segment must be less than the maximum payload for an HTTP data packet.

After converting the video signal 212 into segments, the encoder 214 can encrypt the video signals 212 to prevent unauthorized viewing of the video content. At block 232, the encoder 214 establishes communication with a key server 226 and requests a key to use for encrypting the segmented video signal 212. The key server 226 returns a key to the encoder 214 as shown in block 234. The key used to encrypt the segmented video signal 212 will be referred to herein as the content encryption key. The encoder 214 may use any suitable encryption protocol, such as the Advanced Encryption Standard (AES), to encrypt the segmented video signal using the content encryption key. The location of the key server and the encryption key used to encrypt the segmented video signal is included in a manifest file. The manifest file and the encrypted video signal are then transmitted to the CDN 218 for storage in one of the edge servers 220, as shown in block 236.

At block 238, a user 225 then requests playback of a desired video segment on the video player 222. The video player 222 may be any suitable electronic device to receive the streaming signal 216 such as a desktop computer, a television, a laptop computer, a tablet, Wi-Fi enabled device connected to a video screen, or a mobile phone. The video player 222 requests a manifest file from the manifest server 224 in order to retrieve the information necessary to play the requested video content. With reference again to FIGS. 4 and 5, segments of exemplary manifest files are illustrated that illustrate a portion of the content that may be available in a manifest file. The manifest file is a text file and the particular content on each line of the text file is identified by the directive at the start of the line. For example, FIG. 4 identifies four different streams in the streaming signal 216 where each stream has a different bandwidth. The location of a playlist for each of the streams is also included in the manifest file. FIG. 5 is another manifest file which contains a portion of the playlist of an encrypted video segment. Each line begins with the location of the key server to decrypt the video segment, identifies a particular video segment between 1 and 5 (i.e., the "-1", "-2", etc. . . . prior to the .ts file extension), and provides the location of video segment in the CDN 218. The manifest file may include any information corresponding to the video stream, such as metadata information for the video stream.

When the video player 222 requests the manifest file from the manifest server 224 a connection is established between the devices. A session identifier is also generated to identify the connection. The session identifier may be generated by the video player 222 or the manifest server 224. For purposes of illustration, it will be assumed that the session identifier is generated by the video player 222. The session identifier is transmitted to the manifest server 224 by the video player 222 when requesting a manifest file. The manifest server 224 then requests the manifest file from the CDN 218 at block 242. At block 244, the CDN 218 returns the manifest file to the manifest server 224.

Because the manifest server 224 has established a connection with video player 222, it may customize the manifest file prior to returning the manifest file to the video player 222 and provide a unique manifest file to each video player 222. Without the manifest server 224, the video player 222 retrieves the manifest file directly from the CDN 218 and the content of the manifest file is the same for all users. However, because the manifest server 224 is providing a unique manifest file to each player, the manifest file may include identifying information of the video player 222, the user 225 of the video player, or a combination thereof. Further, the manifest file may be modified to include content specific for the user 225.

The manifest server 224 may be configured to generate an encryption key for each manifest file. The encryption key is generated as a function of the unique session identifier generated by the video player 222 when it requested the desired video content. Optionally, the encryption key may also be generated as a function of the requested video content. As a result, each encryption key is unique to a specific session with a particular video player, resulting in a one-time use unique encryption key. The one-time use unique encryption key will be referred to herein as the manifest encryption key. At block 246, the manifest server 224 transmits the manifest encryption key to the key server 226, and at block 248, the key server 226 acknowledges receipt of the manifest encryption key.

Optionally, the key server 226 may be configured to generate the manifest encryption key. At block 246, the manifest server 224 transmits the session identifier and an identifier corresponding to the desired video content to the key server rather than transferring the manifest encryption key. The key server 226 may then generate the manifest encryption key and, at block 248, return the manifest encryption key to the manifest server 224. After generating or obtaining the manifest encryption key, the manifest server 224 encrypts the manifest file prior to transmitting the manifest file to the video player 222. The manifest server 224 then transmits the encrypted manifest file to the video player 222, as shown at block 250.

Referring again to FIG. 6, if the video player 222 includes an enhanced video player module 229 from the provider of the manifest server 224, the enhanced video player module 229 may be configured to decrypt the encrypted manifest file directly. The manifest encryption key is encrypted in a manner known to both the manifest server 224 and the enhanced video player module 229. Therefore, the enhanced video player module 229 first decodes the manifest encryption key and then decodes the remainder of the manifest file using the manifest encryption key. If, however, the video player does not include an enhanced video player module 229 from the provider of the manifest server 224, the manifest server 224 may include a path to the key server 226, similar to that shown in FIG. 5, and the video player 222 requests the manifest encryption key from the key server 226 as shown in block 252. At block 254, the key server 226 returns the manifest encryption key to the video player 222, and the video player 222 decrypts the manifest file. Having decrypted the manifest file, either directly on the video player 222 with an enhanced video player module 229 or by requesting the manifest encryption key from the key server 226 and then utilizing the native video player module 228 to decode the manifest file, either the enhanced video player module 229 or the native video player module 228 next needs to decode the video content.

In some embodiments, the manifest file may remain unencrypted. When the manifest file is to remain unencrypted, the manifest server 224 may still generate a unique manifest file for the session with the video player 222. The operations in FIG. 7 process as discussed above from block 230 to block 244. However, rather than encoding the manifest file, the manifest server 224 skips blocks 246 and 248, transmitting an unencrypted manifest file to the video player at block 250. The video player 222 reads the manifest file and determines that the video content has been encrypted and, therefore, must still be decrypted.

The video player module reads the location of the key server 226 for the content encryption key from the manifest file. It is contemplated that a single key server 226 may contain both the manifest encryption key and the content encryption key. Optionally, separate key servers 226 may be utilized for each of the encryption keys. The video player 222 requests the content encryption key from the key server 226 identified in the manifest file, as shown in block 256. At block 258, the key server 226 returns the content encryption key to the video player 222. The manifest file will have the address of the CDN 218 as containing the segmented video content. Therefore, the video player can then start retrieving the video content from the CDN. The video player 222 repeatedly requests the next segment in the playlist from the CDN 218 and the CDN returns the requested segment as shown by blocks 260 and 262. The native video player module 228 then decodes the content from the encrypted video segments and displays the requested video content to the user 225.

Figure 8:
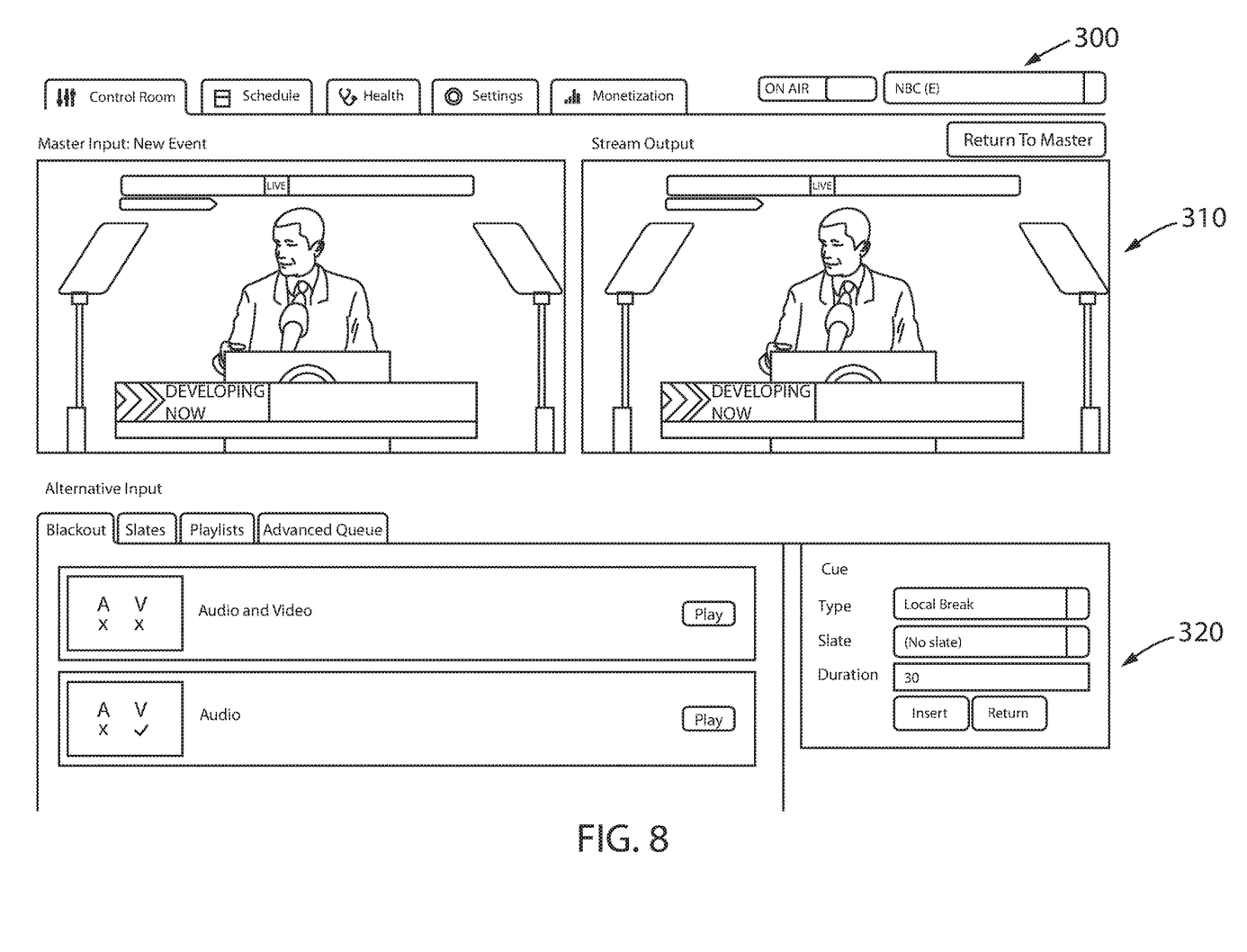
FIG. 8 is a screen shot of a user interface executing on a video manager for selection of metadata to insert into a video stream according to one embodiment of the disclosure.

Turning next to FIG. 8, a user interface 300 may be provided that is executing on the video manager 215. The user interface 300 receives input corresponding to desired control of or action to take on the video player as the video content is being presented to the video player 222. The user interface 300 includes a frame viewer 310 to display the video content on a frame-by-frame basis in order to synchronize metadata with a particular frame of the video content. The user interface 300 further includes an event selector 320 to identify a desired action to be taken on the video player 222. The selected event is encoded as metadata, for example, as an ID3 tag for insertion into the video stream.

Video players 222 are increasingly interactive devices, such as a laptop or tablet computer, a mobile phone, and the like rather than a passive viewing device such as a traditional television. The video player 222 may include a number of native applications, such as a calendar app, web browser, or social media plug-in. The event selected for inclusion as metadata may activate one of the native applications for an enhanced viewer experience. For example, a programming change may launch the calendar app and create an appointment for the calendar. The appointment may identify the new time for a program with a prompt to the viewer allowing the viewer to accept the appointment for insertion onto their calendar. As another example, the event selected may launch the web browser with a window providing additional content, such as a show website or a list of links to websites with subject matter related to a documentary. A viewer may choose to follow one of the links presented. As still another example, the event may launch a social media plug-in asking a user to indicate whether they liked a show or to provide a review of a show on their social media account.

According to another aspect of the disclosure, the metadata may be related to advertisement. Rather than simply provide an advertisement to be displayed on the video player 222, the advertisement may be interactive requiring a viewer to click on one or more boxes, buttons, and so forth, within the advertisement. The prompt to the viewer needs to be displayed at the correct frame within the advertisement so the viewer understands what is being requested. Optionally, the prompt may request a viewer to select from one of multiple advertisements for viewing, delivering content more attractive to a viewer. The metadata may further include instructions to the video player 222 to transmit the viewer interactions back to the user interface 300 for measuring.

According to still another aspect of the disclosure, the metadata may be related to the content of the programming. For example, the viewer may want to watch a live sporting event. However, a number of playback rules may be in place with respect to the event. The playback rules may include, for example, geographic blackout restrictions or geographic transmission of particular events, such as a local team. The live sporting event may run either less than its allotted time or beyond its original time slot. While playback rules may initially have been transmitted according to the original schedule, the rules may need to be updated, for example, to enforce a blackout beyond the schedule when an event runs long or to allow alternate programming to be viewed if an event runs short or is cancelled, for example, due to weather. In addition, it is desirable that the rules are enforced at particular frames to provide for clear transitions to or from the live event and the alternate programming.

According to still another aspect of the disclosure, the metadata may be inserted within the transport stream (TS) file containing the video content. As the encoder 214 receives the video signal 212 from the content provider 210, any triggers inserted within the video signal 212 by the content provider 210 are detected. The video manager 215 receives the triggers and identifies the metadata content corresponding to the trigger. The video manager 215 retrieves the video content from the content server 217. Optionally, the video manager 215 receives metadata and a frame reference from the user interface 300. The video manager 215 may encode the metadata according to the requirements of the transport stream into which it is being inserted or the video manager 215 may transmit the metadata to the encoder 214 where it is encoded. The transport stream includes a metadata stream which includes the content of the metadata (e.g., text or graphic to display, application to launch, playback rule, etc. . . . ) and the frame at which the metadata is to be displayed or activated. The metadata is then transmitted within the transport stream to the video player 222 as discussed above.

According to still another aspect of the disclosure, the metadata is inserted in the manifest file for transmission to the video player. The video manager 215 receives the trigger from the video signal 212 or receives the metadata from the user interface 300 as previously discussed. A custom tag is defined for insertion into the manifest file. The custom tag includes the content of the metadata and the frame reference at which the metadata is to be displayed or activated. The custom tag is inserted into the playlist of the manifest file and transmitted to the video player 222 as discussed above. Insertion of the custom tag into the manifest file may occur either with the encoder 214 or with the manifest server 224. According to one embodiment, the video manager 215 transmits the custom tag to the encoder 214 as the video signal 212 is being encoded. The custom tag is inserted into the manifest file generated by the encoder 214 and stored in the CDN 218. The manifest server 224 initially reads the manifest file from the CDN prior to generating a per-user manifest file and, therefore, the custom tag will be in the manifest file. According to another embodiment, the metadata may be provided at delivery rather than when the original video stream was encoded. The custom tag may be transmitted from the video manager 215 to the manifest server 224 and inserted into the per user manifest file by the manifest server 224.

The video player 222 receives the transport stream and manifest file for the requested video content into which the manifest data has been inserted. Either the native video player module 228 or the enhanced video player module 229 may be used to extract and act on the embedded metadata. If, for example, the metadata is inserted into the transport stream, the native video player module 228 receives the transport stream and processes the metadata. However, rather than receiving just a trigger, the transport stream includes the metadata content and the video player 222 may take the requested action without requiring an out-of-band connection. Similarly, if the metadata is inserted into the manifest file with a custom tag, the enhanced video player module 229 recognizes the tag and creates a metadata stream within the video player 222. The enhanced video player module 229 inserts the metadata stream in the transport stream at the correct frame location. Whether the metadata is inserted into the transport stream or the manifest file, the requested action occurs on the video player 222 at the desired frame of the video content without requiring an out-of-band connection to retrieve content.

In one aspect of the disclosure, a method is provided to inject per-user, per session metadata for advertising or other alternative content (for measuring) that is received from an alternative content server for the particular user-session in a manifest file for delivery to a user's video player.

According to another aspect of the disclosure, a method is provided for creating frame accurate triggers in a video transport stream from metadata that is injected into the manifest file by a per-user manifest delivery system (manifest server). This may allow a video player to provide a notification, such as to a server, with each metadata trigger event, with per frame accuracy.

According to another aspect of the disclosure, a method is provided for a user to interact with advertising or other alternative content (which may be stitched together with requested video content) using metadata triggers and action which may be directed by such metadata triggers. In one aspect, an action may include retrieval of information upon user can triggering the action by clicking on the alternative content as it is displayed.

According to another aspect of the disclosure, a method is provided for measuring advertising or other alternative content for a live stream stitched by a server using frame accurate triggers that are inserted by the system.

According to another aspect of the disclosure, a system is provided which may address the problem measuring advertising or other alternative content accurately when the advertising or other alternative content is stitched together with by a separate server (in which case a video player is only receiving video files and not measuring information embedded in the original advertising or other alternative content).

According to another aspect of the disclosure, a hardware or software module may be implemented in a video player in order to: process a unique video manifest file loaded from manifest server; parse the manifest file, which contains alternative content measuring information; process the manifest file to obtain gross-net times for every alternative content segment; and inject measuring capability into the video stream (TS file) for the alternative content measuring information via frame accurate triggers. In this way, a modified video stream (TS file) is provided to the video player which may allow the video player to trigger to produce detectable events which may be measured by a server or other utility at desired times.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure. It also being understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

We claim:

1. A system for managing video playback comprising:
a manifest server comprising a memory and a processing device coupled to the memory to:
(a) receive a request from a video player on a user device to play a video stream comprising requested content, wherein the requested content is associated with a first manifest file created by an encoder for the requested content and distributed to a first content delivery network along with the requested content;
(b) upon receiving the request:
(i) communicate with the first content delivery network to obtain, from the first content delivery network, the first manifest file stored at the first content delivery network, the first manifest file containing information for allowing the video player to play the requested content stored at the first content delivery network, and information for stitching alternative content with the requested content; and
(ii) communicate with a second content delivery network to obtain information for allowing the video player to play the alternative content, and produce a detectable event in connection with the alternative content;
(c) modify, using a session identifier identifying a connection between the manifest server and the video player, the first manifest file obtained from the first content delivery network to produce a second manifest file unique to the video player having the request, the second manifest file comprising the session identifier, identifying at least one of the video player or the user of the video player, and containing information for allowing the video player to play the requested content and the alternative content stitched with the requested content, and produce the detectable event in connection with the alternative content, wherein the detectable event associated with the alternative content is defined via metadata provided for the alternative content, and wherein the metadata defining the detectable event associated with the alternative content is included in a playlist of the second manifest file; and (d) prior to transmitting the second manifest file to the video player, encrypt the second manifest file using an encryption key generated based on the session identifier.

2. The system of claim 1, wherein the detectable event is produced by a trigger.

3. The system of claim 2, wherein the processing device is to instruct, based on the trigger, the video player to respond, the trigger occurring responsive to a frame of the alternative content starting or stopping.

4. The system of claim 2, wherein the processing device is to instruct, based on the trigger, the video player to respond, the trigger occurring responsive to the alternative content reaching a midpoint.

5. The system of claim 1, wherein the manifest server stitches segments of the alternative content between segments of the requested content according to the second manifest file.

6. The system of claim 1, wherein the playlist provides an address at which the video stream is to be retrieved and at least one of a data rate or a resolution for the video stream.

7. The system of claim 1, further comprising a measuring server in communication with the manifest server, wherein the measuring server stores the detectable event.

8. A method for a manifest server, the method comprising:
  (a) receiving a request from a video player on a user device to play a video stream comprising requested content, wherein the requested content is associated with a first manifest file created by an encoder for the requested content and distributed to a first content delivery network along with the requested content;
  (b) upon receiving the request:
    (i) communicating with the first content delivery network to obtain, from the first content delivery network, the first manifest file stored at the first content delivery network, the first manifest file containing information for allowing the video player to play the requested content stored at the first content delivery network, and information for stitching alternative content with the requested content; and
    (ii) communicating with a second content delivery network to obtain information for allowing the video player to play alternative content and produce a detectable event in connection with the alternative content;
  (c) modifying, using a session identifier identifying a connection between the manifest server and the video player, the first manifest file obtained from the first content delivery network to produce a second manifest file unique to the video player having the request, the second manifest file comprising the session identifier, identifying at least one of the video player or the user of the video player, and containing information for allowing the video player to play the requested content and the alternative content stitched with the requested content, and produce the detectable event in connection with the alternative content, wherein the detectable event associated with the alternative content is defined via metadata provided for the alternative content, and wherein the metadata defining the detectable event associated with the alternative content is included in a playlist of the second manifest file; and
  (d) prior to transmitting the second manifest file to the video player, encrypting the second manifest file using an encryption key generated based on the session identifier.

9. The method of claim 8, wherein the detectable event is produced by a trigger.

10. The method of claim 9, further comprising instructing, based on the trigger, the video player to respond, the trigger occurring responsive to a frame of the alternative content starting or stopping.

11. The method of claim 9, further comprising instructing, based on the trigger, the video player to respond, the trigger occurring responsive to the alternative content reaching a midpoint.

12. The method of claim 8, further comprising the manifest server stitching segments of the alternative content between segments of the requested content according to the second manifest file.

13. The method of claim 8, wherein the playlist provides an address at which the video stream is to be retrieved and at least one of a data rate or a resolution for the video stream.

14. The method of claim 8, further comprising storing the detectable event at a measuring server.

15. A non-transitory computer readable medium comprising instructions, which when executed by a processing device causes the processing device to perform operations comprising:
  (a) receiving a request from a video player on a user device to play for playing a video stream comprising requested content, wherein the requested content is associated with a first manifest file created by an encoder for the requested content and distributed to a first content delivery network along with the requested content;
  (b) upon receiving the request:
    (i) communicating with the first content delivery network to obtain, from the first content delivery network, the first manifest file stored at the first content delivery network, the first manifest file containing information for allowing the video player to play the requested content stored at the first content delivery network, and information for stitching alternative content with the requested content; and
    (ii) communicating with a second content delivery network to obtain information for allowing the video player to play the alternative content, and produce a detectable event in connection with the alternative content;
  (c) modifying, using a session identifier identifying a connection between the manifest server and the video player, the first manifest file obtained from the first content delivery network to produce a second manifest file unique to the video player having the request, the second manifest file comprising the session identifier, identifying at least one of the video player or the user of the video player, and containing information for allowing the video player to play the requested content and the alternative content stitched with the requested content, and produce the detectable event in connection with the alternative content, wherein the detectable event associated with the alternative content is defined via metadata provided for the alternative content, and wherein the metadata defining the detectable event associated with the alternative content is included in a playlist of the second manifest file; and
  (d) prior to transmitting the second manifest file to the video player, encrypting the second manifest file using an encryption key generated based on the session identifier.

16. The non-transitory computer readable medium of claim 15, wherein the detectable event is produced by a trigger.

17. The non-transitory computer readable medium of claim 16, wherein the operations further comprise instructing, based on the trigger, the video player to respond, the trigger occurring responsive to a frame of the alternative content starting or stopping.

18. The non-transitory computer readable medium of claim 16, wherein the operations further comprise instructing, based on the trigger, the video player to respond, the trigger occurring responsive to the alternative content reaching a midpoint.

19. The non-transitory computer readable medium of claim 15, wherein the operations further comprise stitching segments of the alternative content between segments of the requested content according to the second manifest file.

20. The non-transitory computer readable medium of claim 15, wherein the playlist provides an address at which the video stream is to be retrieved and at least one of a data rate or a resolution for the video stream.

\* \* \* \* \*